United States Patent [19]

Hayashi et al.

[11] Patent Number: 5,110,526
[45] Date of Patent: May 5, 1992

[54] PROCESS FOR PRODUCING MOLDED ARTICLES OF POLYTETRAFLUOROETHYLENE RESIN

[75] Inventors: Taira Hayashi, Atsugi; Hiroyuki Watanabe, Kanagawa; Akira Tuchiya, Hachiouzi; Kazuo Hagiwara, Isehara; Iwao Hishiyama, Atsugi, all of Japan

[73] Assignee: Nippon Valqua Industries, Ltd., Tokyo, Japan

[21] Appl. No.: 410,339

[22] Filed: Sep. 21, 1989

[30] Foreign Application Priority Data

Sep. 22, 1988 [JP] Japan .................. 238426

[51] Int. Cl.⁵ .............................. B29C 47/90
[52] U.S. Cl. ...................... 264/127; 264/162; 264/209.1; 264/334; 264/323; 264/337; 264/338; 425/380; 425/393
[58] Field of Search ............ 264/127, 209.1, 150, 264/323, 162, 334, 337, 338; 425/380, 393

[56] References Cited

U.S. PATENT DOCUMENTS

| | | | |
|---|---|---|---|
| 2,939,178 | 6/1960 | Haroldson et al. | 264/127 |
| 3,015,855 | 1/1962 | Merkel | 264/127 |
| 3,050,786 | 8/1962 | St. John et al. | 264/573 |
| 3,085,290 | 4/1963 | Chu | 264/127 |
| 3,182,355 | 5/1965 | Arnaudin, Jr. | 425/392 |
| 3,225,129 | 12/1965 | Taylor et al. | 264/342 R |
| 3,395,205 | 7/1968 | Petzetakis | 264/151 |
| 3,478,144 | 11/1969 | Sato | 425/393 |
| 3,941,546 | 3/1976 | Hartig | 425/392 |
| 4,145,385 | 3/1979 | Sako et al. | 264/127 |
| 4,203,938 | 5/1980 | Burnett et al. | 264/127 |

FOREIGN PATENT DOCUMENTS

46-29635 8/1971 Japan .................. 264/127

Primary Examiner—Jeffery Thurlow
Attorney, Agent, or Firm—Webb, Burden, Ziesenheim & Webb

[57] ABSTRACT

In accordance with the present invention, there is provided a process for producing polytetrafluoroethylene (PTFE) resin molded articles, wherein an unsintered PTFE resin paste extrusion molded article as extruded from an extrusion machine and inserted into a sintering mold having an inside diameter slightly larger than an outside diameter of said unsintered PTFE resin molded article is sintered at a temperature higher than a melting point of the PTFE resin. In another aspect of the invention, PTFE resin molded articles are produced by a process wherein an unsintered PTFE resin paste extrusion molded article immediately after being extruded from an extrusion machine is sized by means of a sizing die, and the unsintered PTFE molded article thus sized is inserted into a sintering mold having an inside diameter slightly larger than an outside diameter of said unsintered molded article, followed by sintering at a temperature higher than a melting point of the PTFE resin. The sintering mold used in both of the processes of the invention preferably has on its inner peripheral surface a slip layer less in frictional resistance.

16 Claims, 6 Drawing Sheets

FIG. 3
FIG. 4
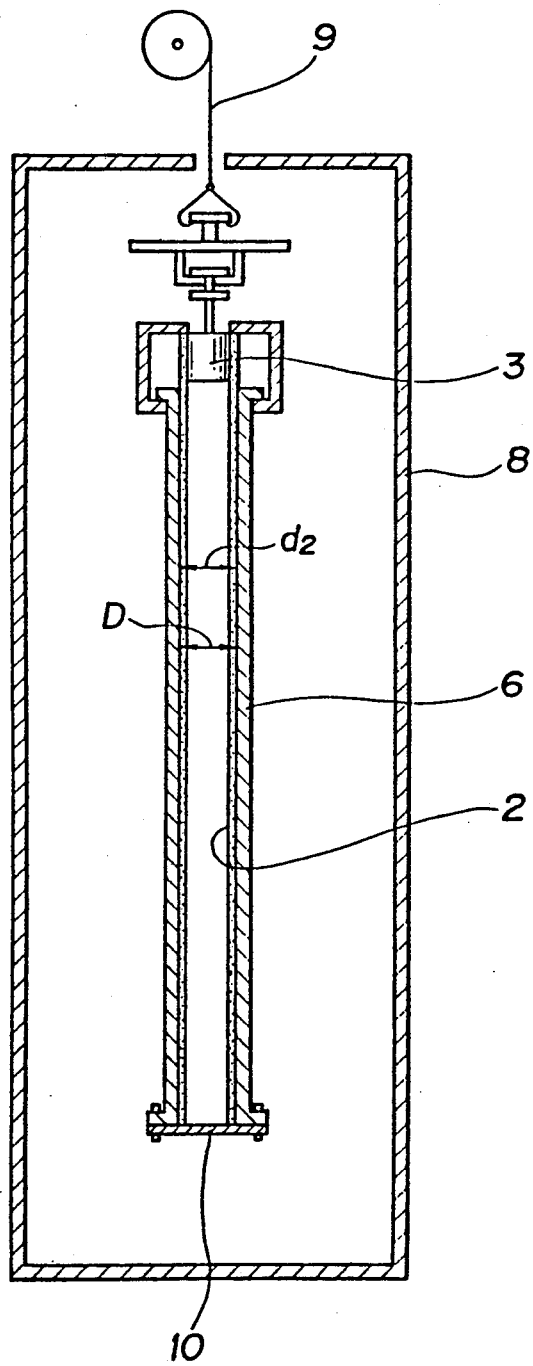
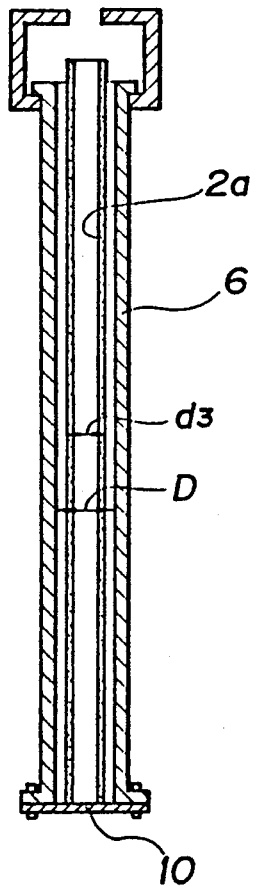

FIG. 5
FIG. 6
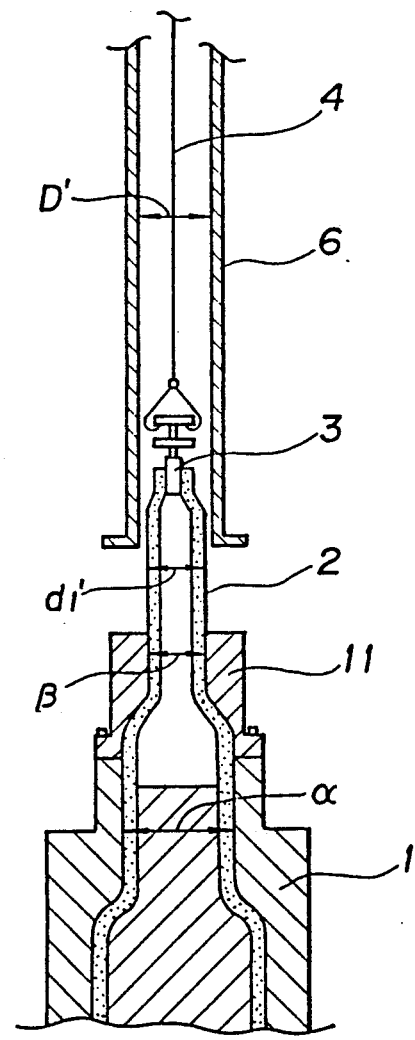
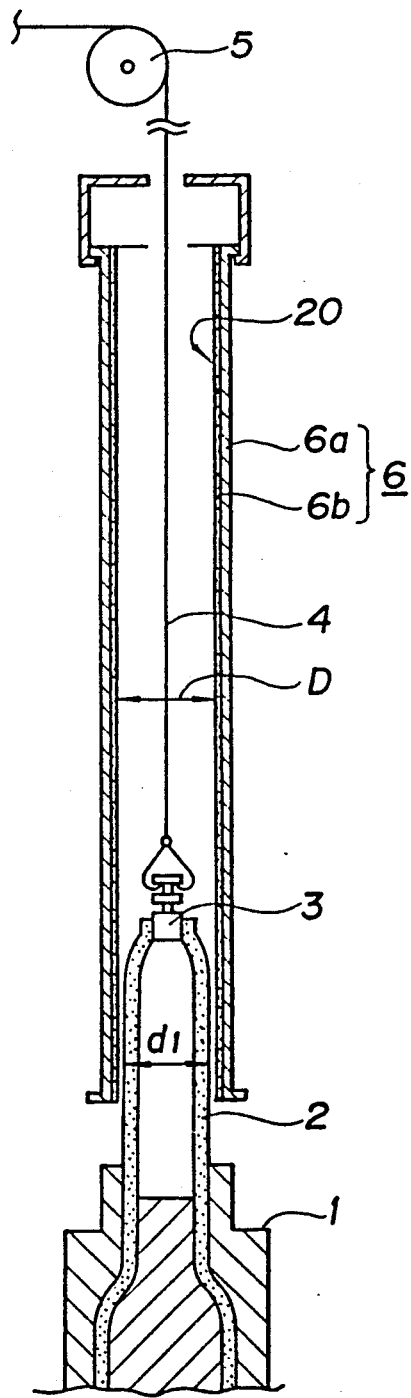

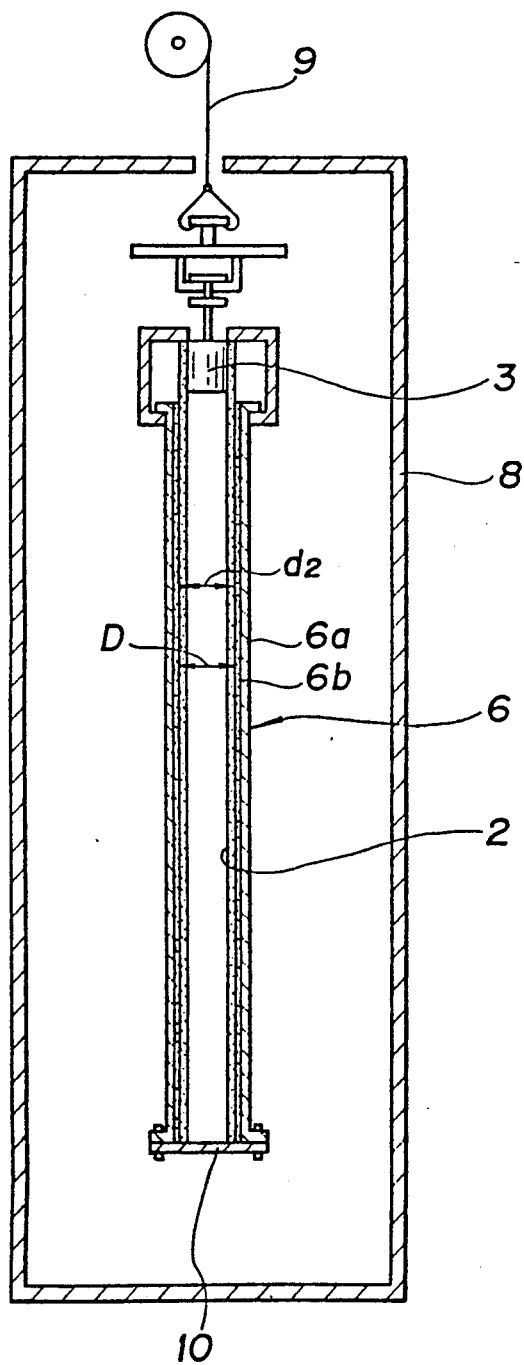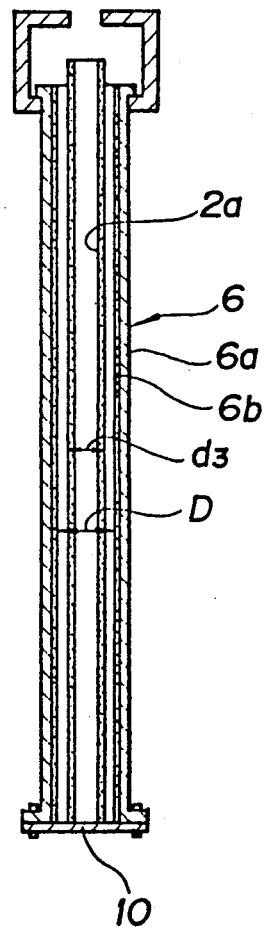

PROCESS FOR PRODUCING MOLDED ARTICLES OF POLYTETRAFLUOROETHYLENE RESIN

FIELD OF THE INVENTION

This invention relates to processes for producing molded articles of polytetrafluoroethylene resin and more particularly to the processes for obtaining molded articles from polytetrafluoroethylene resin by extrusion molding said molded articles such as tubes and rods being free from dimensional irregularity and warpage, and particularly those of comparative long length.

BACKGROUND OF THE INVENTION

As is generally known, polytetrafluoroethylene has a melting viscosity of $10^{11}$ poises or thereabouts even at a temperature of which is higher than its melting point (327° C.), and this melting viscosity is far higher than a viscosity of $10^3$–$10^4$ poises at the molding temperature of common plastics.

On that account, it is not possible to extrude or roll polytetrafluoroethylene resin in the same manner as in the case of common plastics which can be extruded or rolled in a soft or fluid state by heating. Therefore, molded articles of polytetrafluoroethylene resin (hereinafter called PTFE resin) such as tubes and rods are produced by a paste extrusion molding technique.

In this paste extrusion technique, unsintered PTFE resin powder is usually incorporated with an extrusion aid such as solvent naphtha, illuminating kerosine or toluol in order to impart fluidity to said unsintered powder, the resulting mixture is preformed to obtain a preform of a cylindrical shape, the preform (billet) thus obtained is fed into a cylinder of an extrusion machine and extruded therefrom by application of ram pressure. According to the paste extrusion technique, unsintered particles of PTFE resin undergo plastic deformation with the assistance of the extrusion aid and are extruded through a die fitted to the cylinder head, whereby an unsintered PTFE resin molded article formed to shape in continuous form is obtained. The unsintered PTFE resin molded article is then inserted into a long cylindrical oven, wherein said molded article is dried in the drying zone kept at about 100°–250° C. to remove the extrusion aid therefrom, and then sintered in the sintering zone at a temperature above the melting point of PTFE resin, for example, 360°–380° C., followed by cooling, whereby a compact sintered PTFE resin molded article having a sufficient mechanical strength is obtained.

However, when tubes or rods of continuous length were extrusion molded in the manner as mentioned above, in the sintering step subsequent to the drying step there were observed such drawbacks as an outside dimension of the resulting molded article became inhomogeneous, the section of tube or rod was out-of-round, or the above-mentioned tubes or rods of continuous length were not sintered linearly and warped in the lengthwise direction. A further drawback observed was that the molded articles are not obtained with the desired dimensional accuracy of mm unit. This tendency was pronounced particularly in cases where the molded articles were large in outside diameter.

The products produced in this manner, such as tubes or rods, not only depreciated their commercial value but also caused such inconvenience as will be mentioned below when a steel pipe is lined inside with said tube.

As an example of the process for producing a steel pipe lined inside with PTFE, there is a process wherein the steel pipe is lined inside with an extrusion molded PTFE tube by drawing said tube into said pipe. In this case, there must be a clearance between an outer periphery of the lining tube and an inner periphery of the steel pipe to be lined therewith, and usually this clearance is appropriately about 2% of an inside diameter of the steel pipe. Because every section of PTFE tube produced by the prior art process was inhomogeneous in diametral dimension and because of the out-of-roundness of each section, when this tube was drawn inside the steel pipe, a diametral clearance between said tube and said steel pipe varied at each point at which the tube and steel pipe were in contact with each other. On that account, a load was applied particularly to the lining tube at the corner of the flange of the steel pipe which was the stop end thereof in the lengthwise direction, and said lining tube was liable to be damaged and, at the same time, the lining tube in use was liable to buckle. Furthermore, because the section of the lining tube was out of round and was somewhat deformed, said lining tube, when drawn into the steel pipe, came to carry an undue burden.

As a measure to inhibit occurrence of such inconveniences as mentioned above, there is known a so-called annealing treatment, wherein the lining tube drawn into the steel pipe and heated, in an electric oven or the like to eliminate warpage formed on said lining tube.

In order to carry out the above-mentioned annealing treatment, special equipment was needed therefor and much labor and energy were required to operate the treatment satisfactorily, leading to a possible increase in production cost. Furthermore, in molded articles obtained by this annealing treatment, it is possible for residual strain to occur in the molded article and for said molded article deteriorate in mechanical strength.

OBJECT OF THE INVENTION

The present invention has been made to solve at a stroke such inconveniences associated with the production of molded articles of PTFE such as tubes and rods by the prior art extrusion molding techniques, and an object of the invention is to provide processes for producing PTFE extrusion molded articles of desired dimensions with reasonable accuracy and at a moderate cost.

SUMMARY OF THE INVENTION

The process for producing PTFE resin molded articles of the present invention designed to accomplish the object of the invention mentioned above is characterized by inserting an unsintered PTFE resin paste extrusion molded article extruded from an extrusion machine into a sintering mold having an inside diameter slightly larger than an outside diameter of said molded article, followed by sintering at a temperature higher than a melting point of PTFE resin.

In another embodiment, the process for producing PTFE resin molded articles of the present invention is characterized by sizing an unsintered PTFE resin paste extrusion molded article immediately after being extruded from an extrusion machine by means of a sizing die, and inserting the thus sized molded article into a sintering mold having an inside diameter slightly larger than an outside diameter of said sized molded article, followed by sintering at a temperature higher than a melting point of PTFE resin.

The sintering mold used in the processes of the invention as mentioned above is preferably lined on its inner peripheral surface with a slip layer of lower frictional than is offered by the mold itself.

The slip layer used in the sintering mold may be a carbon layer, graphite layer, boron nitride layer or a wire netting. Further the slip layer is preferably formed so that the inner peripheral surface is roughened or the sintering mold is perforated with a large number of through-type holes.

The relationship between an inner diameter (D) of the above-mentioned sintering mold and an outside diameter ($d_1$) of the above-mentioned unsintered TPFE resin paste extrusion molded article is preferably $1 < D/d_1 \leq 1.2$.

In the processes for producing PTFE resin molded articles of the present invention, the PTFE resin paste extrusion molded articles as extruded from the extrusion machine are inserted into the sintering mold followed by sintering. Accordingly, even when these molded articles undergo thermal expansion at the time of sintering, outward expansion thereof in the diametral direction is restricted by the inner peripheral surface of the sintering mold, and contraction of the sintered molded articles caused by the subsequent cooling operation becomes homogeneous. Therefore, it becomes possible to produce PTFE resin molded articles having desired dimensions uniform in outside diameter in the axial direction with good accuracy in an easy manner and at low cost.

In the processes for producing PTFE resin molded articles of the present invention using a sintering mold having particularly a slip layer formed on an inner peripheral surface of said mold, when a PTFE resin paste extrusion molded article as extruded from an extrusion machine is inserted wherein said molded product is sintered and then cooled, this molded article undergoes displacement slidingly in the axial direction along the slip layer formed on the inner peripheral surface of the sintering mold. In this case, even if air is admitted to permeate through between the molded article and the sintering mold, the air may be allowed to escape therefrom through the slip layer. Accordingly, the molded article inserted into the sintering mold undergoes displacement smoothly in the axial direction during sintering and cooling operation in the sintering mold, whereby no bamboo joint-like annular projections are formed on the surface of said molded article, the outer peripheral surface of said molded article becomes smooth and the outside diameter of said molded article becomes uniform in the axial direction thereof.

In this connection, the present inventors presume that formation of the slip layer on the inner peripheral surface of the sintering mold would be advantageous for the following reasons.

When an unsintered PTFE resin paste extrusion molded article as extruded is inserted into a sintering mold and sintered, this molded article undergoes thermal expansion in the diametral direction and comes closely in contact with an inner peripheral surface of said mold and, at the same time, said molded article undergoes displacement by contraction in the axial direction along the inner peripheral surface of said mold. When the molded article thus sintered is cooled, said molded article contacts slightly in the diametral direction and, at the same time, also contracts in the lengthwise direction, whereby said molded article undergoes displacement along the inner peripheral surface of the sintering mold. In that case, however, it is observed by the present inventors that in the midst of this cooling operation the molded article undergoes displacement by expansion to nearly 7% in the axial direction at a temperature of about 300°-330° C.

At the time when the expansion and contraction in the diametral direction are not coincident with the expansion and contraction in the axial direction in the molded article being treated in this manner, the outer peripheral surface of said molded article is still in contact with the inner peripheral surface of the sintering mold. When the molded article in this contacted state undergoes displacement by expansion and contraction in the axial direction, expansion and contraction in the axial direction will not proceed uniformly all over the molded article in some cases and the aforementioned bamboo joint-like annular projections are sometimes formed on the outer peripheral surface of said molded article. No such phenomenon as above is practically observed when PTFE resin molded articles are in short lengths and slender, but this phenomenon tends to increase when said molded articles are in continuous lengths and are large in outside diameter.

DETAILED DESCRIPTION OF THE INVENTION

The present invention is illustrated below with reference to embodiments of the invention as shown in the accompanying drawings.

FIGS. 1-4 are rough sectional views showing each step of the process for producing PTFE molded articles in one embodiment of the invention.

FIG. 5 is a rough sectional view showing the process for molded articles in a further embodiment of the invention.

FIGS. 6, 8, 9 and 10 are rough sectional views showing each step of the process for producing PTFE resin molded articles in another embodiment of the invention.

The embodiment of the present invention shown in FIGS. 1-4 shows a case in which a PTFE resin molded article of a tubular shape is produced. Further, this embodiment illustrates an instance of "upward extrusion" wherein an unsintered PTFE tube is extruded upwardly. However, the invention is not limited to this instance, and the unsintered PTFE tube may be extruded, for example, in the downward direction.

In the process of the invention, in order to impart fluidity at about room temperature, unsintered powder of PTFE resin is first incorporated with an extrusion assistant such as solvent naphtha, illuminating kerosine or toluol, and the resulting mixture is then preformed to obtain a preform of a cylindrical or columnar shape. The unsintered PTFE powder used in this case is in the form of an agglomerate of fine particles of PTFE having an average primary particle diameter, without particular limitation, of preferably 0.05-1.0 $\mu$m, said fine particles forming secondary particles then agglomerate to form a so-called PTFE fine powder.

Figure 1:
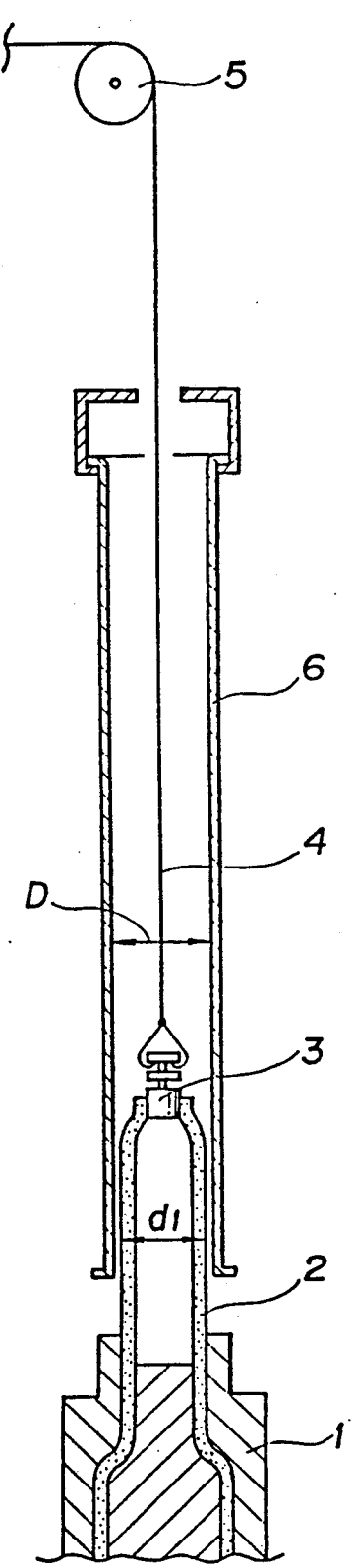

Subsequently, this preform is inserted into a cylinder the extrusion machine and then extrusion molded under application of ram pressure through a die 1 of the extrusion machine into a tubular form in the manner, for example, as shown in FIG. 1. In that case, according to the present embodiment, it is so designed that the extrusion molding operation of a tubular unsintered PTFE resin paste extrusion molded article 2 is made smooth by hooking a hook 3 at the tip portion of said extrusion molded article 2 and pulling up the hook 3 by means of a wire 4 and a pulley 5.

In the present invention, the unsintered PTFE resin paste extrusion molded article 2 as extruded through the die 1 the extrusion machine is inserted into a sintering mold 6 which consists of a cylindrical member having an inside diameter D slightly larger than an outside diameter $d_1$ of this molded article 2. The inside diameter D of the sintering mold 6 is decided in such a manner that in the subsequent step of sintering the paste extrusion molded article 2, this molded article 2 is expanded outwardly in the diametral direction and pressed on an inner peripheral surface of the sintering mold 6. The inside diameter D of the sintering mold 6 and the outside diameter $d_1$ of the paste extrusion molded article 2 are preferably in the relationship as shown below.

$$1 < D/d_1 \leq 1.2$$

The tube constituting the sintering mold 6 is preferably a thin metallic seamless tube. This is because working efficiency is improved the adverse effect on the appearance of a PTFE resin molded article to be sintered in the sintering mold 6 is inhibited. Of the metallic seamless tubes, preferred is a stainless steel seamless tube.

Figure 2:
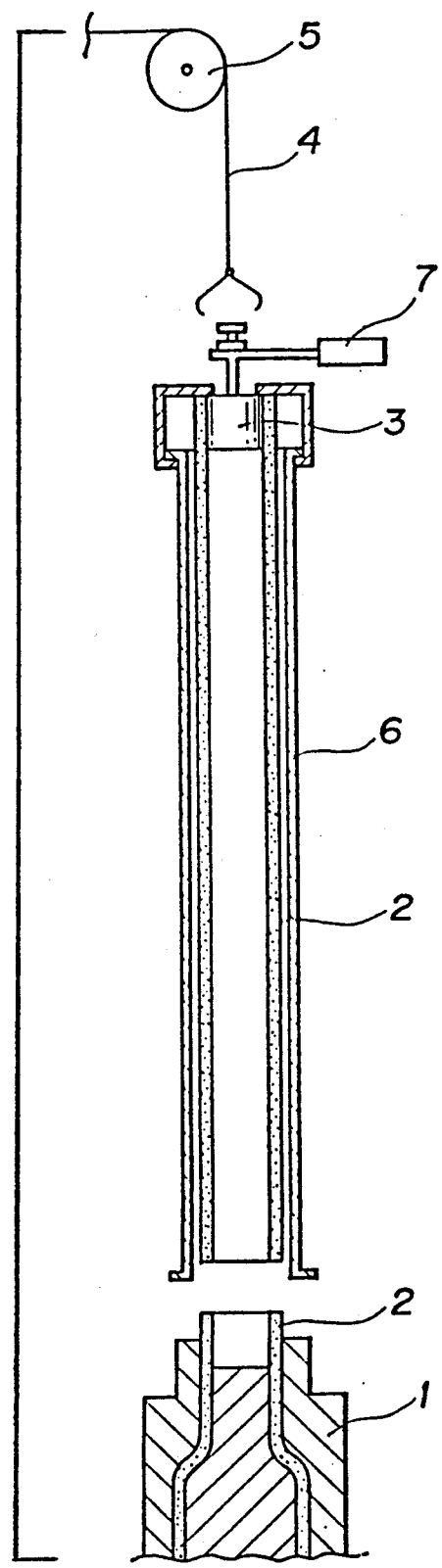

After inserting the PTFE resin paste extrusion molded article 2 in the lengthwise direction into the sintering mold 6 illustrated above, the paste extrusion molded article 2 is cut off at the position between the lower end of the sintering mold 6 and the die 1 as shown in FIG. 2. Then, the hook 3 is released from the wire 4, the hook 3 is then hooked on a moving means 7, and the paste extrusion molded article 2 and the sintering mold 6 are held by the moving means 7.

Subsequently, the sintering mold 6 into which the paste extrusion molded article 2 has been inserted is transferred by means of the moving means 7 into an oven 8 as shown in FIG. 3, and the sintering mold is held by means of a wire 9. Simultaneously therewith, or prior thereto, the lower portion of the sintering mold 6 is covered with a blank plate 10.

Under these circumstances, the temperature of the oven 8 is elevated and the paste extrusion molded article 2 present in the sintering mold 6 is sintered thereby. Prior to this sintering operation, the extrusion assistant contained in the paste extrusion molded product 2 is removed therefrom by drying said molded article 2. Such removal of the extrusion assistant by drying is carried out by heating the paste extrusion molded article 2 containing the same at a temperature of about 100°-250° C., but may be carried out simultaneously with the sintering operation or may be carried out by a separate step.

The sintering temperature employed for sintering the paste extrusion molded article 2 is a temperature above the melting point (327° C.) of PTFE, suitably 340°-380° C., and the sintering time employed therefor is preferably 2-6 hours.

In the sintering step as illustrated above, the paste extrusion molded article 2 being sintered expands outwardly in the diametral direction and also expands in the lengthwise direction. In this case, however, the outward expansion in the diametral direction of the extrusion molded product 2 is restricted by the sintering mold 6, whereby the outer peripheral surface comes in contact under pressure with the inner peripheral surface of the sintering mold 6. That is, the outside diameter $d_2$ of the molded article 2 being sintered becomes equal to the inside diameter D of the sintering mold 6 ($d_2 = D$). In that case, because the sintering mold 6 is a metallic tube, the thermal expansion thereof can be ignored relative to the thermal expansion of the molded article 2. Accordingly, the molded article 2 expands in a state where uniform thermal stress is applied to all over the molded article 2, while pressing the inner peripheral surface of the sintering mold 6.

Subsequently, the sintering mold 6 is taken out of the oven 8 as shown in FIG. 4, and cooled down to room temperature. When the molded article 2 thus sintered is cooled to below the melting point of PTFE, said molded article 2 begins to contract, the thermal stress is gradually released, and eventually a PTFE resin molded article 2a having an outside diameter $d_3$ slightly smaller than the inside diameter D of the sintering mold 6 is obtained. The outside diameter $d_3$ of the PTFE resin paste extrusion molded article 2a obtained as an end product is decided according to a $D/d_1$ ratio of the outside diameter $d_1$ of the unsintered PTFE resin paste extrusion molded article 2 to the inside diameter D of the sintering mold 6 and to other various factors such as the cooling rate employed, etc.

The present invention is not limited to the above-mentioned embodiment, and variations and modifications can be effected within the spirit and scope of the invention.

For example, as shown in FIG. 5, a sizing die 11 is fitted to the end portion of the die 1 of an extrusion machine, an unsintered PTFE resin paste extrusion molded article 2 immediately after once being extruded through said die 1 is reduced in diameter by passing the unsintered PTFE resin paste extrusion molded article through the sizing die 11 whose bore diameter $\beta$ is smaller than a bore diameter $\alpha$ of the die 1 and the molded article thus reduced in diameter is then inserted into a sintering mold 6 having an inside diameter slightly larger than an outside diameter $d_1$ of said molded article 2, followed by the same procedures as in the aforementioned embodiment shown in except that the molded article thus reduced in diameter by means of the sizing die 11 after extrusion through the die 1 is expanded in diameter because of a restoring force of the article 2 resulting from compression on entering the sizing die 11, so that the clearance between the article 2 and the sintering mold 6 is made smaller and almost disappears when the article is intered in the mold before sintering.

In the embodiment shown in FIG. 5, the relationship between a bore diameter d of die 1 of the extrusion machine and a bore diameter $\beta$ of the sizing die 11 is preferably $(\alpha-\beta)/\alpha < 0.08$.

When the unsintered PTFE paste extrusion molded article 2 immediately after once being extruded through die 1 of the extrusion machine is reduced in diameter in the manner as mentioned above, the molded article 2 thus reduced in diameter can be inserted into a sintering mold having a smaller inside diameter, and the unsintered PTFE paste extrusion molded article 2 thus inserted uniformly comes into contact with the inner peripheral surface of the sintering mold 6 by restoration of the stress of said molded article 2, whereby a product is obtained with higher dimensional accuracy in comparison with that obtained from an unsized molded product in the aforementioned embodiment shown in FIGS. 1-4.

Figure 7:
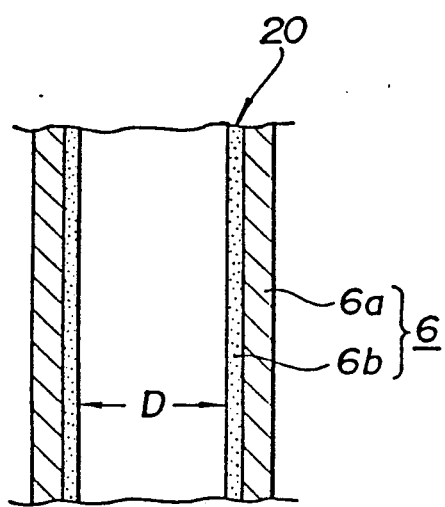
FIG. 7 is a sectional view of a portion of a sintering mold used in another embodiment of the invention mentioned above.
Figure 8:
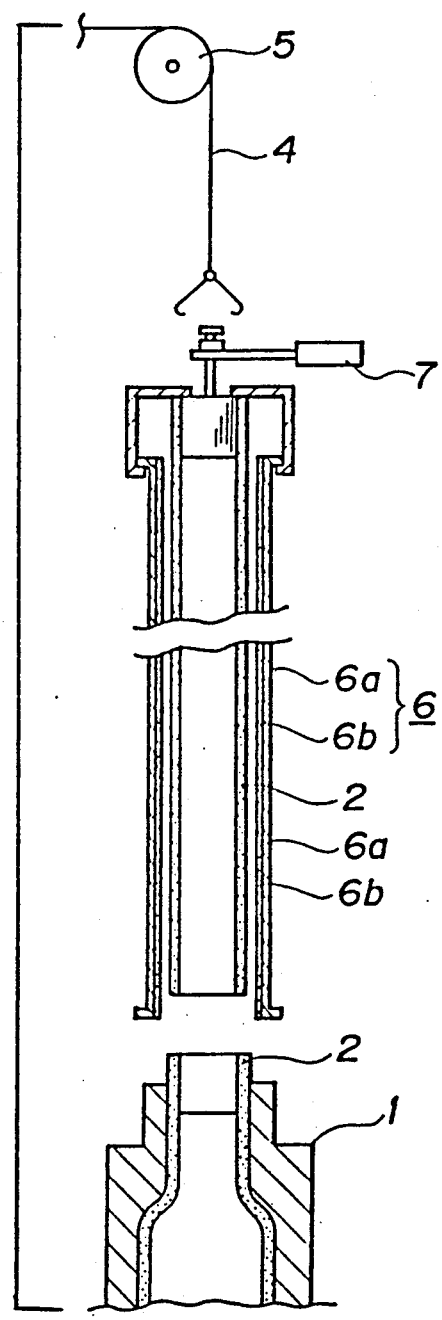

In the present invention, moreover, as shown in FIGS. 6-10, there may be used a sintering mold 6 having formed on its inner peripheral surface a slip layer 20 lower in frictional resistance than that of the mold. This slip layer 20 is used to reduce frictional resistance between a PTFE resin paste extrusion molded article 2 and the inner peripheral surface of the sintering mold 6 when said molded article is sintered or cooled in said sintering mold 6, whereby said molded article being sintered or cooled is allowed to undergo smooth displacement. Accordingly, this slip layer 20 may be composed of any materials so far as they have heat resistance to the sintering temperature of the unsintered PTFE paste extrusion molded article 2 and are lower in rubbing friction. In the embodiment shown in FIGS. 6-10, the sintering tube 6a having joined a carbon layer 6b to the inner peripheral layer of said sintering tube 6a is used. In this connection, besides the carbon layer 6b, the slip layer 20 may also include a graphite layer and a boron nitride layer. The sintering mold 6a may also be formed from such materials constituting the slip layer 20 FIG. 7 is an expanded view of a section of the sintering mold 6 in embodiments shown in FIGS. 6, 8, 9 and 10, in which said mold comprises a sintering tube or pipe 6a whose inner peripheral surface has been lined with a carbon layer 6b as mentioned above integrally with said slip layer 20.

The embodiment shown in FIGS. 6-10 conforms to the embodiment shown in FIG. 1-4 or FIG. 5, except that the slip layer 20 has been formed on the inner peripheral surface of the sintering mold, so it is unnecessary to repeat a description of the procedures.

Since the sintering mold used in the embodiment shown in FIGS. 6-10 has the slip layer 20 formed on the inner peripheral surface thereof, even when the molded article 2 being sintered undergoes contraction displacement, the frictional resistance produced between said molded article 2 and said slip layer 20 is very small, whereby the molded article 2 always undergoes displacement smoothly along the slip layer 20 and no deformation of the outer peripheral surface of the molded article 2 in the diametral direction will occur.

Furthermore, at the initial stage of the cooling operation, the molded article 2 contracts in the diametral direction and, at the same time, undergoes expansion displacement in the axial direction. However, because the slip layer is formed on the inner peripheral surface of the sintering mold 6, frictional resistance produced between said molded article 2 and said slip layer 20 is very small even when this expansion displacement in the axial direction proceeds. Thus, the molded article 2 always undergoes smooth displacement along the slip layer 20, and no deformation of the outer peripheral surface of the molded article 2 in the diametral direction will occur. Further, because the contraction of the molded article 2 uniformly and smoothly proceeds in the axial direction, a PTFE resin molded article of desired dimensions and also having a uniform outside diameter can be obtained with high accuracy.

Figure 11:
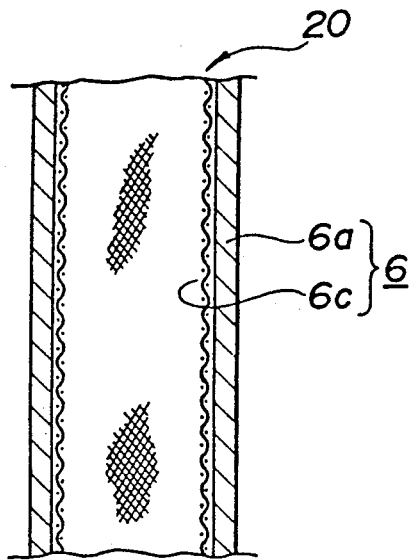
FIGS. 11, 12 and 13 are sectional views of sintering molds used in a still further embodiment of the invention.

FIG. 11 shows a sintering mold 6 used in a further embodiment of the invention, and a slip layer 20 to be formed on the inner peripheral surface of said sintering mold 6 is composed of a wire netting 6c. In this wire netting 6c, because each wire has a circular section, when this wire netting 6c is used as the slip layer 20, the slip layer 20 comes in contact with a molded article 2 at multiple points of contact, kinetic or rubbing friction therebetween becomes small, and hence frictional resistance produced between the molded article 2 and the slip layer 20 can be reduced to almost nil. This wire netting 6c preferably has a mesh size of about 30-60 meshes. In the present invention, the sintering mold 6 may be composed entirely of such a wire netting as mentioned above.

Figure 12:
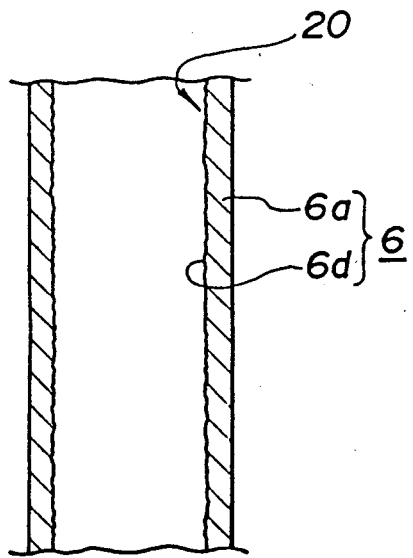

FIG. 12 shows a sintering mold 6 used in a still further embodiment of the invention, and an uneven surface 6d is formed on an inner peripheral surface of a sintering tube 6a as the above-mentioned slip layer by subjecting the inner peripheral surface of the above-mentioned sintering tube 6a to blast finishing. The uneven surface 6d thus formed comes in contact with a molded article 2 substantially at multiple points of contact, kinetic or rubbing friction therebetween becomes small, and hence frictional resistance produced between the molded article 2 and the uneven surface 6d can be reduced to almost nil.

Figure 13:
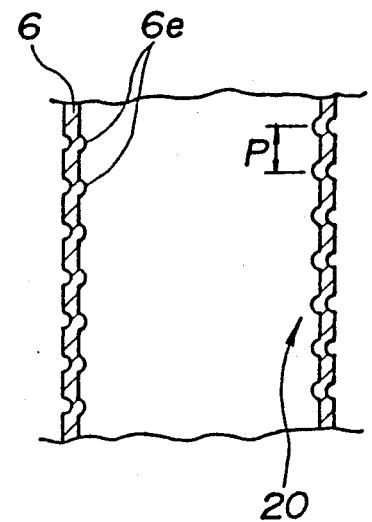

Furthermore, as shown in FIG. 13, the sintering mold 6 may be composed of an embossed tube so as to form a number of embosses 6e on an inner peripheral surface of the sintering mold 6. Each emboss 6e preferably has a half-round shape so that the molded article comes in point contact therewith. The emboss 6e preferably has a pitch of 0.4-5.0 mm, and an area on which the emboss 6e is formed is preferably 20-60% based on the total area of inner peripheral surface of the sintering mold 6. The emboss 6e preferably has a crest height of about 0.1-2.0 mm.

Figure 14:
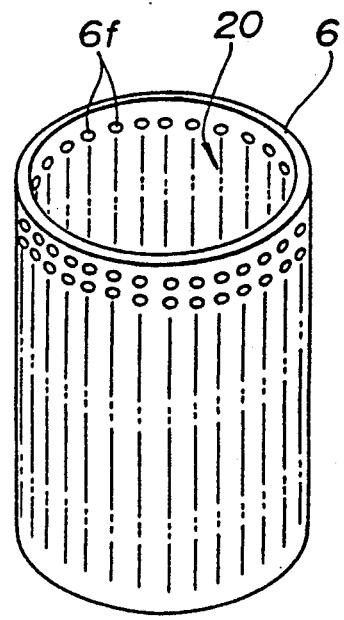
FIG. 14 is a perspective view of a sintering mold used in a particular embodiment of the invention.

Still further, as shown in FIG. 14, the sintering mold 6 may be perforated on its periphery to form a number of perforations 6f so that said perforations 6f act as a slip layer 20. Though not particularly limited, the perforation has a bore diameter of 0.1-3.0 mm, preferably 0.5-1.5 mm. The sum of perforation areas is preferably 20-60% based on the total inner peripheral area of the sintering mold 6.

In the present invention, a tube having formed such embosses 6e or perforations 6f thereon may be used, as the sintering mold. However, this tube may also be inserted into a mold separately prepared so that the resulting combination is used as a sintering mold.

In the cases wherein the sintering mold having the slip layer 20 shown in any of FIGS. 11-14, because of excellent breathability of said slip layer 20, no air reservation will occur partially between the molded article 2 and the slip layer 20 and no deformation of the outer peripheral surface of the molded article 2 will occur thereby.

The PTFE resin molded articles produced by the process of the present invention may have varied forms such as a solid columnar form, a bellows form, a form of laminated composite with a reinforcing material and like forms, including of course a tubular form.

The present invention is illustrated below with reference to examples.

EXAMPLE 1

PTFE powder (Teflon ® 6J) mixed with about 20% by weight of an extrusion assistant (Isoper E) and preformed at 5 kg f/cm² was extruded through an extrusion die having a nozzle of 55.5 mm in inside diameter into an unsintered PTFE tube of 50A (outside diameter 55.9 mm) in nominal dimension and 7.2 m in length.

This tube was inserted into a sintering tube of 57.2 mm in inside diameter and 7.2 m in length, and the tube was then dried at about 150° C. to remove said extrusion assistant therefrom.

The unsintered PTFE tube inserted in said sintering tube was placed, in an oven, and sintered at 370° C., followed by cooling to room temperature. Variation in outside diameter and difference in flatness of the sintered PTFE tube thus cooled were measured to obtain the results as shown in Tables 1 and 2, respectively.

EXAMPLE 2

PTFE powder (Teflon ® 6J) mixed with about 20% by weight of an extrusion assistant (Isoper E) and preformed at 5 kg f/cm² was extruded through an extrusion die having a nozzle of 55.5 mm in inside diameter into an unsintered PTFE tube which was simultaneously passed through a sizing die made of PTFE having a minimum inside diameter of 52.8 mm and connected to said extrusion die. The unsintered PTFE tube passed through the sizing die had an outside diameter of 54.5 mm.

The unsintered PTFE tube thus sized was then inserted into a sintering tube of 56 mm in inside diameter, followed by removal by drying of the extrusion assistant and sintering said unsintered PTFE tube under the same conditions as in Example 1.

After cooling, variation in outside diameter and difference in flatness of the sintered PTFE tube were measured to obtain the results shown in Tables 1 and 2, respectively.

COMPARATIVE EXAMPLE 1

The unsintered PTFE tube extruded in Example 1 was not inserted into a sintering tube, and was dried in a state of being hanged on a hook to remove the extrusion assistant therefrom, followed by sintering under the same conditions as in Example 1.

After cooling, variation in outside diameter and difference in flatness of the sintered PTFE tube were measured to obtain the results as shown in Tables 1 and 2, respectively.

EXAMPLE 3

PTFE powder (Teflon ® 6J) mixed with about 20% by weight of an extrusion assistant (Isoper E) and preformed at 5 kg f/cm² was extruded through an extrusion die having a nozzle of 113 mm in inside diameter into an unsintered PTFE tube of 100 A (outside diameter 114 mm, inside diameter 110 mm) in nominal dimension and 7.2 m in length.

This tube was inserted into a sintering tube having an inside diameter of 118 mm and a length of 7.2 m and lined on its inner peripheral surface with a carbon layer 6a and then dried at about 150° C. to remove the extrusion assistant therefrom.

The unsintered PTFE tube thus dried in the sintering tube was placed, as it was, in an oven and sintered at 370° C., followed by cooling up to room temperature. After cooling, variation in outside diameter and difference in flatness of the sintered PTFE tube were measured to obtain the results as shown in Tables 3 and 4, respectively.

EXAMPLE 4

The unsintered PTFE tube extruded in Example 1 was inserted into a sintering tube of 118 mm in inside diameter having formed a wire netting of 30–60 meshes on its inner peripheral surface, followed by removal by drying of the extrusion assistant and sintering said unsintered PTFE tube under the same conditions as in Example 1.

After cooling, variation in outside diameter and difference in flatness of the sintered PTFE tube were measured to obtain the results as shown in Tables 3 and 4, respectively.

COMPARATIVE EXAMPLE 2

The unsintered PTFE tube extruded in Example 3 was not inserted into a sintering tube, and was then dried in a state of being hanged on a hook to remove the extrusion assistant therefrom followed by sintering under the same conditions as in Example 3.

After cooling, variation in outside diameter and difference in flatness of the sintered PTFE tube were measured to obtain the results as shown in Tables 3 and 4, respectively.

TABLE 1

| | (Outside diameter distribution) | | | | | Maximum difference in outside diameter |
|---|---|---|---|---|---|---|
| | (a) | (b) | (c) | (d) | (e) | |
| Compar. Ex. 1 | 53.2 | 53.2 | 54.3 | 55.4 | 56.4 | Δ3.2 |
| Example 1 | 53.0 | 54.0 | 53.8 | 53.7 | 52.7 | Δ1.3 |
| Example 2 | 51.9 | 52.2 | 52.4 | 52.5 | 51.7 | Δ0.8 |

Notes:
(a)–(e) each represent an outside diameter (mm) of the sintered tube as measured at a position of said tube starting from the top end thereof with an interval of 1400 mm.

TABLE 2

| | (Flatness) | | | | | | | | |
|---|---|---|---|---|---|---|---|---|---|
| | (a) | | | (b) | | | (c) | | |
| | X | Y | $\frac{|X-Y|}{X}$ | X | Y | $\frac{|X-Y|}{X}$ | X | Y | $\frac{|X-Y|}{X}$ |
| Compar. Ex. 1 | 53.8 | 52.6 | 0.0223 | 53.8 | 52.6 | 0.0223 | 55.0 | 53.3 | 0.0309 |
| Example 1 | 53.2 | 52.2 | 0.0188 | 54.2 | 53.7 | 0.0092 | 54.2 | 53.5 | 0.0129 |
| Example 2 | 52.2 | 51.7 | 0.0096 | 52.5 | 51.8 | 0.0133 | 52.7 | 52.1 | 0.0114 |

| | (d) | | | (e) | | | Mean of $\frac{|X-Y|}{X}$ |
|---|---|---|---|---|---|---|---|
| | X | Y | $\frac{|X-Y|}{X}$ | X | Y | $\frac{|X-Y|}{X}$ | |
| Compar. Ex. 1 | 56.2 | 53.8 | 0.0391 | 57.1 | 55.2 | 0.0333 | 0.02958 |

TABLE 2-continued

| | | | (Flatness) | | | | |
|---|---|---|---|---|---|---|---|
| Example 1 | 54.0 | 52.9 | 0.0204 | 53.2 | 52.1 | 0.0207 | 0.01640 |
| Example 2 | 52.4 | 51.7 | 0.0134 | 51.8 | 51.3 | 0.0097 | 0.01148 |

Notes:
(a)–(e) are as defined in Table 1. As shown in the right figure, X is an outside diameter of the sintered tube in the direction of axis X at the positions of (a)–(e) of said tube, respectively, and Y is an outside diameter of the sintered tube in the direction of axis Y at the positions of (a)–(e) of said tube, respectively.

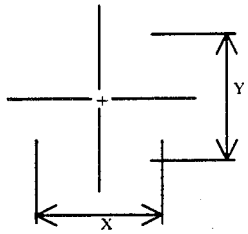

TABLE 3

(Outside diameter distribution)

| | (a) | (b) | (c) | (d) | (e) | Maximum difference in outside diameter |
|---|---|---|---|---|---|---|
| Compar. Ex. 2 | 104.0 | 106.5 | 110.0 | 112.5 | 114.0 | Δ10.0 |
| Example 3 | 100.3 | 101.1 | 102.2 | 103.0 | 103.9 | Δ3.6 |
| Example 4 | 99.3 | 99.3 | 100.0 | 101.0 | 103.2 | Δ3.9 |

Notes:
(a)–(e) are as defined in Table 1.

TABLE 4

(Flatness)

| | (a) | | | (b) | | | (c) | | |
|---|---|---|---|---|---|---|---|---|---|
| | X | Y | $\frac{|X-Y|}{X}$ | X | Y | $\frac{|X-Y|}{X}$ | X | Y | $\frac{|X-Y|}{X}$ |
| Compar. Ex. 2 | 103.0 | 102.1 | 0.0087 | 111.7 | 99.5 | 0.1092 | 113.0 | 102.7 | 0.0912 |
| Example 3 | 100.8 | 98.9 | 0.0188 | 103.0 | 98.0 | 0.0485 | 105.9 | 98.3 | 0.0718 |
| Example 4 | 99.9 | 97.3 | 0.0260 | 99.2 | 97.6 | 0.0161 | 100.3 | 98.3 | 0.0199 |

| | (d) | | | (e) | | | Mean of |
|---|---|---|---|---|---|---|---|
| | X | Y | $\frac{|X-Y|}{X}$ | X | Y | $\frac{|X-Y|}{X}$ | $\frac{|X-Y|}{X}$ |
| Compar. Ex. 2 | 122.5 | 97.5 | 0.2041 | 123.9 | 98.1 | 0.2082 | 0.1243 |
| Example 3 | 103.3 | 102.5 | 0.0077 | 104.9 | 102.0 | 0.0276 | 0.0349 |
| Example 4 | 101.5 | 99.5 | 0.0197 | 105.5 | 99.7 | 0.0550 | 0.0273 |

Notes:
(a)–(e) are as defined in Table 1. As shown in the right figure, X is an outside diameter of the sintered tube in the direction of axis X at the positions of (a)–(e) of said tube, respectively, and Y is an outside diameter of the sintered tube in the direction of axis Y at the positions of (a)–(e) of said tube, respectively.

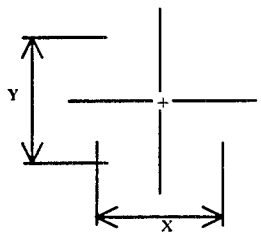

What is claimed is:

1. A process for producing polytetrafluoroethylene resin molded articles, which comprises the steps of:
   extruding from an extrusion machine an unsintered polytetrafluoroethylene resin paste extrusion molded article having an outer peripheral surface;
   inserting said unsintered molded article into a sintering mold comprising a cylindrical member having an inner peripheral surface, in such a manner that a clearance is produced between the outer peripheral surface of said unsintered molded article and the inner peripheral surface of said sintering mold;
   sintering said unsintered molded article in a state of being inserted in said sintering mold at a temperature higher than a melting point of the polytetrafluoroethylene resin by means of an oven to produce a sintered molded article, so that said sintered molded article expands outwardly in its radial direction and in its longitudinal direction, said expansion causing said clearance to disappear and causing the outer peripheral surface of the sintered molded article to be pressed against the inner peripheral surface of said sintering mold;
   cooling said sintered molded article to cause it to contract to form a contracted molded article; and
   removing said contracted molded article from said sintering mold.

2. The process as claimed in claim 1, wherein said molded article is cylindrically shaped.

3. A process for producing polytetrafluoroethylene resin molded articles, which comprises the steps of:
  extruding from an extrusion machine an unsintered polytetrafluoroethylene resin paste extrusion molded article having an outer peripheral surface and an outside diameter;
  reducing said outside diameter of said unsintered molded article immediately after once being extruded through said extrusion machine by means of passing said unsintered molded article through a sizing die to produce a reduced unsintered molded article;
  inserting said reduced unsintered molded article into a sintering mold comprising a cylindrical member having an inner peripheral surface, in such a manner that a clearance is produced between the outer peripheral surface of said reduced unsintered molded article and the inner peripheral surface of said sintering mold, so that said clearance is reduced to form a reduced clearance because of a restoring force within said reduced unsintered molded article produced by compression in passing through said sizing die;
  sintering said reduced unsintered molded article in a state of being inserted into said sintering mold at a temperature higher than a melting point of the polytetrafluoroethylene resin by means of an oven to produce a sintered molded article, so that the sintered molded article expands outwardly in its radial direction and in its longitudinal direction, said exansion causing said reduced clearance to disappear and causing the outer peripheral surface of said sintered molded article to be pressed against the inner peripheral surface of said sintering mold;
  cooling said sintered molded article to cause it to contract to form a contracted molded article; and
  removing said contracted molded article from said sintering mold.

4. The process as claimed in claim 3, wherein the sintering mold has a slip layer lower in frictional resistance than that of said sintering mold and formed on the inner peripheral surface thereof, whereby the contracted molded article may be slipped from the sintering mold in the longitudinal direction in such a way that the outer peripheral surface of said contracted molded article remains in contact with said slip layer of the sintering mold.

5. A process for producing polytetrafluoroethylene resin molded articles as claimed in claim 4, wherein the molded article is cylindrically-shaped and in the steps of sintering and cooling the cylindrically-shaped molded article is allowed to be slipped in the longitudinal direction in such a way that the outer peripheral surface of the cylindrically-shaped molded article remains in contact with the slip layer of the sintering mold during the steps of sintering and cooling.

6. The process as claimed in claim 4, wherein the slip layer is selected from the group consisting of carbon, graphite and boron nitride.

7. The process as claimed in claim 4, wherein the slip layer is composed of a wire netting.

8. The process as claimed in claim 4, wherein the slip layer is formed by roughening the inner peripheral surface of the sintering mold.

9. The process as claimed in claim 4, wherein the slip layer is formed by providing the periphery of the sintering mold with a plurality of perforations.

10. A process for producing a polytetrafluoroethylene resin molded article, which comprises the steps of:
  extruding from an extrusion machine an unsintered polytetrafluoroethylene paste extrusion molded article which is shaped cylindrically so as to have an outer peripheral surface;
  inserting said unsintered cylindrically-shaped molded article into a sintering mold comprising a cylindrical member having an inner peripheral surface, in such a manner that a clearance is produced between the outer peripheral surface of said unsintered cylindrically-shaped article and the inner peripheral surface of said sintering mold, in which the clearance satisfies the following relationship, $1 < D/d_1 \leq 1.2$, where D is an inside diameter of the sintering mold, and $d_1$ is an outside diameter of the unsintered cylindrically-shaped molded article;
  sintering said unsintered cylindrically-shaped article in a state of being inserted in said sintering mold at a temperature higher than a melting point of the polytetrafluoroethylene resin by means of an oven to produce a sintered cylindrically-shaped molded article, so that said sintered cylindrically-shaped molded article expands outwardly in its radial direction and in its longitudinal direction, said expansion causing said clearance to disappear and causing the outer peripheral surface of the sintered cylindrically-shaped molded article to be pressed against the inner peripheral surface of said sintering mold; and
  cooling said sintered cylindrically-shaped molded article to cause it to contract to form a contracted molded article, so that the contracted molded article may be removed from said sintering mold.

11. The process as claimed in claim 10, wherein the length of the sintering mold is greater than that of the unsintered molded article.

12. A process as claimed in claim 10, wherein said sintering mold includes a slip layer lower in frictional resistance than that of said sintering mold and formed on the inner peripheral surface thereof, so that, in the steps of sintering and cooling, the cylindrically-shaped molded article is allowed to be slipped in the longitudinal direction in such a way that the outer peripheral surface of said cylindrically-shaped molded article remains in contact with said slip layer of the sintering mold.

13. The process as claimed in claim 12 wherein the slip layer is selected from the group consisting of carbon, graphite, and boron nitride.

14. The process as claimed in claim 12 wherein the slip layer is composed of a wire netting.

15. The process as claimed in claim 12 wherein the slip layer is formed by roughening the inner peripheral surface of the sintering mold.

16. The process as claimed in claim 12 wherein the slip layer is formed by providing the periphery of the sintering mold with a plurality of perforations.

* * * * *

UNITED STATES PATENT AND TRADEMARK OFFICE
CERTIFICATE OF CORRECTION

PATENT NO. : 5,110,526

DATED : May 5, 1992

INVENTOR(S) : Taira Hayashi, Hiroyuki Watanabe, Akira Tuchiya, Kazuo Hagiwara and Iwao Hishiyama It is certified that error appears in the above-identified patent and that said Letters Patent is hereby corrected as shown below:

Cover page, under [30] Foreign Application Priority Data, insert
--Aug. 25, 1989 [JP] Japan ... 1-219296--.

Column 1 Line 18 after "temperature of" insert --380° C.,--.

Column 2 Line 39 "deterionate" should read --to deteriorate--.

Column 3 Line 5 after "frictional" insert --resistance--.

Column 3 Line 15 "TPFE" should read --PTFE--.

Column 3 Line 67 "contacts" should read --contracts--.

Column 4 Line 36 after "for" insert --producing PTFE--.

Column 4 Line 52 after "of" insert --so-called--.

Column 5 Lines 1-2 "cylinder the" should read --cylinder of the--.

Column 5 Line 14 "die 1 the" should read --die 1 of the--.

UNITED STATES PATENT AND TRADEMARK OFFICE
CERTIFICATE OF CORRECTION

PATENT NO. : 5,110,526

DATED : May 5, 1992

INVENTOR(S) : Taira Hayashi, Hiroyuki Watanabe, Akira Tuchiya, Kazuo Hagiwara and Iwao Hishiyama It is certified that error appears in the above-identified patent and that said Letters Patent is hereby corrected as shown below:

Column 5 Line 31 "improved the" should read --improved and the--.

Column 6 Line 48 "$d_1$" should read --$d_1'$--.

Column 6 Line 50 after "in" insert --FIGS. 1-4--.

Column 6 Line 57 "intered" should read --sintered--.

Column 6 Line 60 "d" should read --$\alpha$--.

Column 7 Line 30 after "20" insert --as mentioned above integrally with said slip layer 20--.

Column 7 Lines 35-36 after "6b" delete --as mentioned above integrally with said slip layer 20--.

Column 7 Line 38 "FIG. 1-4" should read --FIGS. 1-4--.

UNITED STATES PATENT AND TRADEMARK OFFICE
CERTIFICATE OF CORRECTION

PATENT NO. : 5,110,526

DATED : May 5, 1992

INVENTOR(S) : Taira Hayashi, Hiroyuki Watanabe, Akira Tuchiya, Kazuo Hagiwara and Iwao Hishiyama It is certified that error appears in the above-identified patent and that said Letters Patent is hereby corrected as shown below:

Column 7 Line 41 "procedures" should read --procedure--.

Claim 3 Line 33 Column 13 "exansion" should read --expansion--.

Signed and Sealed this

Thirteenth Day of July, 1993

MICHAEL K. KIRK

*Attest:*

*Attesting Officer*   Acting Commissioner of Patents and Trademarks